Patented Jan. 26, 1937

2,069,183

UNITED STATES PATENT OFFICE 2,069,183

LIGHT COLORED HIGHLY HALOGENATED NAPHTHALENE AND PROCESS OF PRODUCING SAME

Ernest R. Hanson, Bloomfield, and Sandford Brown, Montclair, N. J., assignors to Halowax Corporation, New York, N. Y., a corporation of Delaware No Drawing. Application April 2, 1934, Serial No. 718,678

9 Claims. (Cl. 260—161)

This invention relates to the manufacture of very light colored highly halogenated naphthalene directly from a crude product.

The chlorine substitution products of naphthalene are now most generally obtained by passing chlorine gas through liquefied naphthalene either in the absence or presence of a catalyst which assists the substitution of chlorine atoms for the hydrogen atoms in the ring. The highly chlorinated crude products are mixtures of a number of chlorine compounds of naphthalene and impurities and the mass is of a black color. These and other characteristics decidedly limit the use to which the materials can be put. Before our discovery, attempts at purification of these highly chlorinated crude materials had been made by fractional distillation at atmospheric pressure but it has been impossible to obtain light colored products and the best that has been accomplished is to obtain semi-purified products which have a dark brown or dirty green color. These semi-purified products are of somewhat more general application than the crudes but are still unsatisfactory, for instance for coating code wires, because the lighter colors of the established code for wires cannot be obtained. The coloring materials which are in the highly chlorinated crudes can not economically and satisfactorily be removed by filtration nor have they been removed by vacuum distillation from such highly halogenated materials as we treat. Repeated filtrations of the high chlorine content crude materials with contact agents, such as carbon and diatomaceous earth have done no more than lighten the color to the dark green or dirty brown obtained in the usual purification while increasing the cost of the product due to the added cost of the filtration steps.

We have discovered that extremely light colored materials may be obtained directly from highly chlorinated crude naphthalene by the simple expedient of distilling in a closed distillation system under a high vacuum preferably below 100 m. m. of mercury but always under basic conditions. The process is especially adaptable to commercial products because the treatment can be carried out in any of the usual forms of apparatus for fractional distillation now on the market. The highly chlorinated naphthalenes are preferred for electrical insulation, flame proofing properties and water proofing properties. They are more amorphous and have a greater water and electrical resistance, and as they have a very high content of chlorine, they are better flame proofing materials than the lower chlorinated materials. The higher chlorine content materials are also very much more difficult to purify by the usual methods and are always darker than the less chlorinated products. However, we are able to bring these higher chlorinated materials up to the desired light colors by proceeding in accordance with our process.

For these highly chlorinated materials, the naphthalene is chlorinated, preferably by passing chlorine through molten naphthalene until the crude chlorinated naphthalene product has a specific gravity of 1.49 or higher at 150° C. Crude halogenated naphthalenes of these gravities contain such amounts and types of impurities due to their high halogenation that, although purification by distillation has been tried, a large part of the impurities have heretofore appeared in the distillate rendering it unfit for a great many uses particularly where chemical neutrality, stability and substantially white color is desired. In fact, a color lighter than 3 has, so far as we know, never before been obtained from crude chlorinated naphthalene having a gravity of 1.49 or higher at 150° C. This color test is made in accordance with that described in Scientific Circular #367 of the American Paint & Varnish Manufacturer's Association. This test is made by dissolving the chlorinated naphthalene in an equal weight of water white toluol, placing the solution in a water white glass tube having an inside diameter of approximately 10.6 mm., placing this in a test box containing a circular disc of color standards and then revolving the disc until the color of the samples and the color standard match. The color of the chlorinated naphthalene is then given the number of the color standard.

In carrying out the process, a still, for instance a horizontal tank, pipe or flash still, is charged with the crude highly chlorinated naphthalene which has incorporated with it, lime, barium hydroxide, sodium hydroxide or other basic material to give a light colored product as well as to neutralize the acidity and to assist in the elimination or breaking up of unstable addition products. Also the basic material may be added to the still after the crude halogenated naphthalene has been charged. For the highly chlorinated products prepared in the usual commercial process with reasonable care, up to 3 or 4% of the base is sufficient but more or less may be used depending upon the amount and kind of free halogen, acid or unstable products, to obtain a neutral final product. When the still is charged, heat is applied in any suitable manner either externally or internally, the vacuum is applied and the still pressure is reduced below 100 m. m. of mercury absolute pressure preferably below 35 m. m. The temperature of distillation will vary with the particular charge and the particular cut desired and with the degree of vacuum obtained. Several instances of temperatures, pressures, etc. will be given in order to illustrate variations in the process. A crude black chlorinated naphthalene having a gravity of 1.51 at 150° C. was distilled under 33 m. m. of mercury absolute pressure in the presence of 2% of lime and a fraction collected between 234 and 280° C. The distillate when cooled to room temperature or 20° C. was a white wax having a color number of 1 when tested as heretofore described, was neutral when tested with litmus, having a melting point of 115-121° C., chlorine content of approximately 59%, dielectric strength (instantaneous breakdown) of 294 volts per mil, an amorphous structure, power factor of 0.2% at 1000 cycles and dielectric constant of 4.4. In another instance, chlorinated naphthalene having a gravity of 1.61 at 150° C. was distilled in the presence of 3% of lime under 30.5 m. m. of mercury absolute pressure and a fraction collected between 234 and 280° C. The distillate when cooled to room temperature or 20° C., was a substantially white wax having a color number of approximately 1.5 when tested as heretofore described, was neutral when tested with litmus, having a melting point of 132-138° C., chlorine content of approximately 62%, dielectric strength (instantaneous breakdown) of 301 volts per mil, an amorphous structure, power factor of 0.2% at 1000 cycles, and dielectric constant of 4.

In all of these instances, the fractions can be made in such ranges of boiling points and halogen content as desired for special purposes.

From these experiments at greatly reduced pressures, we have found that even though the crude material of high specific gravity is somewhat in the nature of a pitch, the pitchy residue remaining in the still after the distillation and which must be disposed of as low grade product, is greatly reduced in amount and larger amounts of the desirable fraction are obtained. The yield is as high as 92-95% even on these highly chlorinated materials. The desirable product is substantially white and has the desired high halogen content which, in the case of chlorine is from 59 to 70.2% by weight with the other halogens in corresponding percentages depending upon their atomic weights and the products are all extremely light colored waxes. The combination of yields of approximately 92-95% together with substantially white color and purity and close limits in range of halogen content, is not obtainable from halogenated naphthalenes whose crudes have a gravity of 1.49 or higher, by operating at atmospheric pressure.

During distillation, samples of the condensate are drawn off at intervals and color, specific gravity and melting point determined. From the specific gravity and melting point one can get an indication of the halogen content. In addition to the white color, the low pressure enables the process to be so closely regulated when desired that temperature fluctuation may be held in all instances to less than 5° C. on either side of the desired distillation temperatures and in some instances to as little as 1° C., with the result that products which have only an exceedingly slight variation in the halogen content for instance plus or minus 1%, can be obtained. In addition, the low temperatures which we are enabled to use, even though the highly chlorinated materials are distilled, prevent in large measure the deterioration of the apparatus due to the chemical action of the products of pyrolysis of the high gravity materials if processed under atmospheric pressure. Also, even though the products have a high halogen content, they can be freely handled without any irritation to the skin or injury to the hands which is not the case with products distilled at atmospheric pressure from these high specific gravity and highly chlorinated crude materials.

We claim:—

1. A method of obtaining substantially white highly chlorinated substitution products of naphthalene, which comprises distilling at a low pressure of 100 m. m. of mercury or less, an impure chlorinated naphthalene having a gravity of at least 1.49 at 150° C., and collecting a fraction having a substantially white color, a melting point between substantially 115° C. and 138° C. and a chlorine content between substantially 59% and substantially 62%.

2. A method of obtaining substantially white highly chlorinated substitution products of naphthalene which comprises distilling at a low pressure of 100 m. m. of mercury or less, an impure chlorinated naphthalene, and collecting a fraction having a halogen content from substantially 59% to substantially 62%, a color lighter than 3 as described and a melting point between substantially 115° C. and 138° C.

3. A method of obtaining light colored highly chlorinated substitution products of naphthalene which comprises chlorinating naphthalene to a gravity of at least 1.49 at 150° C., distilling said chlorinated naphthalene at a low pressure of 100 m. m. of mercury or less, and collecting a fraction having a chlorine content from substantially 59% to substantially 62% and a melting point substantially between 115° C. and 138° C.

4. A method of obtaining light colored highly chlorinated substitution products of naphthalene which comprises chlorinating naphthalene to a gravity of at least 1.49 at 150° C., distilling said chlorinated naphthalene at a low pressure of 100 m. m. of mercury or less, and collecting a fraction having a chlorine content from substantially 59% to substantially 62%, and a melting point between substantially 115° C. and 138° C. and a color lighter than 3 as described.

5. A method of obtaining light colored highly chlorinated substitution products of naphthalene which comprises chlorinating naphthalene to a gravity of at least 1.49 at 150° C., distilling said chlorinated naphthalene at a low pressure of 100 m. m. of mercury or less with a substance acting chemically as a base, and collecting a fraction having a color lighter than 3 as described, a melting point substantially between 115° C. and 138° C. and a chlorine content between substantially 59% and 62%.

6. A method of obtaining light colored highly chlorinated substitution products of naphthalene which comprises distilling at a low pressure of 100 m. m. of mercury or less in the presence of a substance acting chemically as a base, an impure chlorinated naphthalene having a gravity of at least 1.49 at 150° C., and collecting a fraction having a halogen content from substantially 59% to substantially 62% and a melting point substantially between 115° C. and 138° C.

7. A light colored highly chlorinated substitution product of naphthalene such as may be obtained by fractionally distilling at a low pressure of 100 m. m. of mercury or less, a crude chlorinated naphthalene product having a specific gravity of at least 1.49 at 150° C., and collecting a fraction having a color lighter than 3 as described, a melting point between substantially 115° C. and 138° C. and a chlorine content between substantially 59% and 62%.

8. A light colored highly chlorinated substitution product of naphthalene such as may be obtained by fractionally distilling at a low pressure of 100 m. m. of mercury or less, a crude chlorinated naphthalene product having a specific gravity of at least 1.49 at 150° C., and collecting a fraction having a melting point between substantially 115° C. and 138° C. and a chlorine content between substantially 59% and 62%.

9. A light colored substantially neutral highly chlorinated substitution product of naphthalene such as may be obtained by fractionally distilling at a low pressure of 100 m. m. of mercury or less, a crude chlorinated naphthalene product having a specific gravity above 1.49 at 150° C., in the presence of a substance acting chemically as a base to neutralize acidity and collecting a fraction having a chlorine content from substantially 59% to substantially 62%, a color lighter than 3 as described, and a melting point between substantially 115° C. and 138° C.

ERNEST R. HANSON.
SANDFORD BROWN.